Patented June 10, 1947

2,422,013

UNITED STATES PATENT OFFICE 2,422,013

PREPARATION OF IMINES

Vernon E. Haury, El Cerrito, and Seaver A. Ballard, Oakland, Calif., assignors to Shell Development Company, San Francisco, Calif., a corporation of Delaware No Drawing. Application February 14, 1944, Serial No. 522,376

10 Claims. (Cl. 260—566)

This invention relates to the preparation of imines. It relates particularly to a novel method for preparing imines which comprises reacting a ketone with ammonia and hydrogen at elevated temperatures and pressures in the presence of a hydrogenation catalyst.

Organic imines are useful for a variety of purposes. Many of them are useful as insecticides, as compounding agents for rubber and as intermediates in the synthesis of other types of valuable organic compounds. The imines are particularly useful as intermediates in the synthesis of secondary amines, since the preparation of secondary amines by the ordinary methods is usually complicated by the occurrence of side reactions which materially lessen the yield of the desired product. Thus, when it is attempted to prepare secondary amines by treating monohalogenated hydrocarbons with ammonia, mixtures of primary, secondary and tertiary amines are formed from which it is very difficult or even impossible to separate the desired secondary amines in a pure state. When it is attempted to prepare secondary amines by the exhaustive hydrogenation of carbonyl compounds in the presence of ammonia, alcohols are formed in addition to primary, secondary and tertiary amines so that in this case also it is difficult to isolate the desired secondary amines in good yields and uncontaminated by the other products of the reaction. It is possible, however, to avoid these difficulties and to prepare secondary amines in a pure condition and in excellent yields by first preparing the imine of the structure corresponding to that of the desired secondary amine by the process of the present invention, separating the imine from the unreacted starting materials as well as from any by-products of the reaction, and then reducing the said imine by treatment with hydrogen, preferably in the presence of a suitable hydrogenation catalyst.

Heretofore, imines have been prepared by a variety of methods. It is well known, for example, to prepare aldimines of the Schiff's base type by the condensation of aldehydes with primary amines in accordance with the general equation

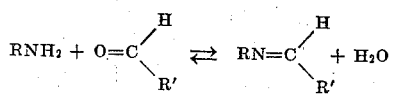

wherein R and R' are hydrocarbon radicals. Because of the reactive nature of the carbonyl group of the aldehyde, this condensation takes place with comparative ease. Instances in which ketones have been condensed with primary amines to form the corresponding ketimines are, however, less numerous. The condensation in this case leads to the formation of ketimines of the general type

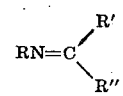

wherein R, R' and R'' are organic radicals, for example, hydrocarbon radicals. This reaction may be represented by the general equation

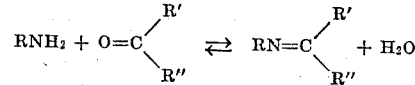

It takes place less readily than does the combination of an aldehyde with a primary amine. Prior investigators have found, however, that aromatic imines may be prepared by reacting an aromatic ketone with an aromatic amine in the presence of a condensation catalyst. Condensation catalysts used for this purpose have included iodine, the halogen acids such as hydrobromic acid, zinc chloride, phosphorous pentoxide, etc. It has also been found possible to make ketimines of the type described by condensing a ketone dichloride with an amine. These methods are almost without exception, however, special methods useful only for the preparation of small quantities of imines to be used as laboratory reagents or specimens, or as intermediates in the synthesis of other compounds on a laboratory scale. The reagents required to effect the synthesis are generally too expensive, the necessary equipment is too complex and costly, the experimental procedure too tedious, and the yields of imine formed are too small to make these known methods attractive for the commercial synthesis of imines.

It has now been found that imines may be prepared directly from ketones by the catalytic treatment of the ketones with ammonia and hydrogen. When a ketone is reacted with hydrogen and ammonia in the presence of a suitable catalyst and under the proper conditions of temperature and pressure, the first reaction to take place is probably the reaction of the ketone with ammonia and hydrogen to form the corresponding primary amine, as is illustrated by the following equation:

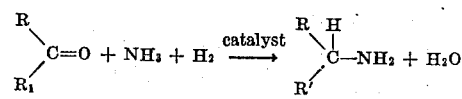

This amine is not isolated, however, since it immediately condenses with additional amounts of ketone present in the reaction mixture to form the corresponding imine:

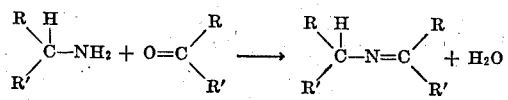

The over-all effect of the present process is thus to effect the preparation of imines directly from the corresponding ketones by a single reaction in accordance with the general equation:

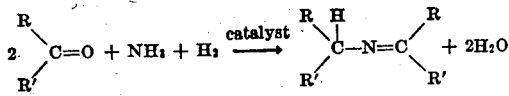

Broadly stated, therefore, the process of the present invention comprises reacting a ketone with ammonia and hydrogen at a reaction temperature, at superatmospheric pressure, and in the presence of a hydrogenation catalyst. One embodiment of the invention is represented by the process which may be employed for the production of N(dihydroisophoryl)-dihydroisophoronimine,

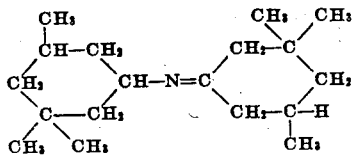

In this embodiment, isophorone,

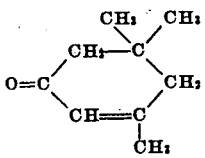

is treated in a suitable reaction vessel with ammonia and hydrogen at a temperature of from about 125° C. to about 175° C. at a pressure of from about 100 to about 1000 pounds per square inch and in the presence of a hydrogenation catalyst, for example, finely divided nickel. The following reaction takes place:

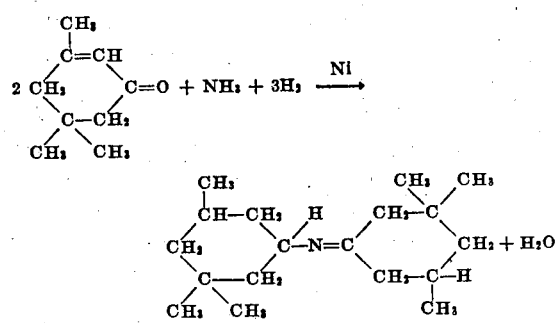

The N(dihydroisophoryl)-dihydroisophoronimine may be separated from any unreacted starting materials and from the small amounts of by-products which may be present in the reaction mixture by any suitable means, preferably by fractional distillation.

The process of the invention is not limited, however, to the use of isophorone and compounds of closely related structure as starting materials. A wide variety of ketones may be used. In general, imines may be prepared by the process of the present invention from ketones having the general formula

wherein R and R' represent hydrocarbon radicals such as the alkyl, alkenyl, cycloparaffinic, cycloalkenyl and aromatic radicals. These radicals may be substituted with non-interfering functional groups, i. e., groups which are non-reactive toward each other and/or hydrogen under the conditions of the reaction. Suitable functional groups are, for example, the ether, hydroxyl, secondary amino, and tertiary amino groups. Some representative ketones which may be used as starting materials in the synthesis include acetone, methyl ethyl ketone, methyl isobutyl ketone, methyl n-propyl ketone, methyl isopropyl ketone, methyl n-butyl ketone, methyl amyl ketone, diethyl ketone, ethyl propyl ketone, ethyl butyl ketone, ethyl amyl ketone, dipropyl ketone, propyl butyl ketone, dibutyl ketone, butyl amyl ketone, allyl butyl ketone, diamyl ketone, 2,4-hexanedione, methyl vinyl ketone, isophorone, dihydroisophorone, cyclopentanone, cyclopentenone, cyclohexanone, cyclohexenone, acetophenone, ethyl phenyl ketone, benzophenone and the homologues, analogues and suitable substitution products of these compounds.

Imines may be prepared in accordance with the process disclosed herein by reacting a single ketone with ammonia and hydrogen, thus forming a single imine as a product. However, if it is desired to prepare a mixture of imines, this may be accomplished by reacting a mixture of different species of ketones with ammonia and hydrogen. The resulting mixture of imines may be used without resorting to the separation of the constituents or, if desired, separation of the imines may be effected by any suitable means as by fractional distillation if there is a sufficiently great difference in the boiling temperatures of the imines.

The invention thus provides a simple, efficient, economical process for preparing imines of the type

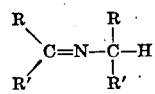

directly from readily available starting materials, i. e. the corresponding ketones. This represents a distinct advantage over the methods of the prior art which require the utilization of the relatively unavailable and expensive primary amines as starting materials. The present method also provides means for preparing good yields of imines in a pure state. The imines so produced are therefore especially well suited for use in the various industrial processes in which they may be applied, especially in the manufacture of the corresponding secondary amines.

As is apparent from an inspection of the equation representing the process of the presently disclosed invention, i. e.,

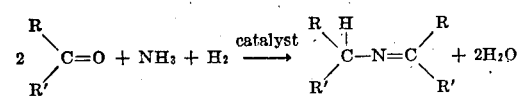

proper regulation of the relative amounts of the reactants used and of the reaction time is an important factor in determining the success of the process. When R and R' represent saturated groups, the reacting materials should be used in the approximate stoichiometric ratio of 2 mols of ketone to 1 mol of hydrogen and 1 mol of ammonia. The amount of hydrogen used is of particular importance. If less than the indicated amount is used, the yield of imine is substantially reduced. If, on the other hand, a large excess of hydrogen is used, this will favor the formation of alcohols and of the secondary amine corresponding in structure to the desired imine and formed by the reduction of the >C=N— group of the latter:

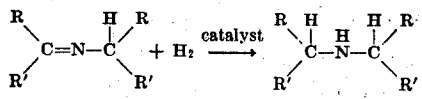

The hydrogenation of the >C=N— group takes place with relatively great difficulty, however, and is not an important interfering factor when the amounts of reactants and the operating conditions are properly regulated. When, as in the case of the conversion of isophorone to N(dihydroisophoryl)-dihydroisophoronimine, an unsaturated compound, i. e., isophorone is used as a starting material, the amount of hydrogen used may be increased by an amount equal to 1 mol of hydrogen for each unsaturated linkage present in the molecule of the unsaturated compound. The product in this case will be the corresponding saturated imine.

As indicated, the operating conditions must also be controlled so as to minimize the formation of the secondary amine by the hydrogenation of the >C=N— group of the imine product. Excessively high pressures and long periods of operation must therefore be avoided. Although the optimum conditions will vary with the particular starting material used, preferred operating temperatures lie within the range of between about 50° C. and about 250° C., while preferred operating pressures are from about 100 to about 1500 pounds per square inch.

Since imines may be hydrolyzed to the corresponding primary amines and ketones when contacted with an excess of water under the proper conditions, it is important to keep the reaction mixture comprising a ketone, ammonia and hydrogen as free from water as is possible. For this reason it is desirable in many instances to fit the reaction vessel with means such as a fractionating column for separating the water from the reaction mixture substantially as soon as it is formed. It is also usually desirable to distill the reaction product under dehydrating conditions, e. g., by means of a dehydrating still, to insure that it is water free and to effect the condensation of any ketone and primary amine which may be present in the reaction mixture thereby forming additional quantities of imine product. For this reason also, i. e., for the reason that imines may be hydrolyzed to form ketones and primary amines, it is preferred to introduce the ammonia into the reaction mixture as anhydrous ammonia rather than as its aqueous solution, i. e., as ammonium hydroxide. The ammonia may be introduced in the form of ammonia gas or as liquid ammonia. If introduced as ammonia gas, it may be introduced into the reaction chamber either separately or in admixture with the hydrogen. A convenient and preferred method for introducing the ammonia is to mix the proper amount of liquid ammonia with a mixture comprising a ketone and the requisite amount of catalyst which mixture has been previously cooled to a temperature which is below the boiling temperature of liquid ammonia, and is contained in a suitable reaction vessel. The vessel is then closed, allowed to come up to room temperature, and the mixture hydrogenated at the desired temperature for the desired length of time.

Any material which is active as a hydrogenation catalyst may be used as a catalyst to effect the combination of ketone, ammonia and hydrogen to form an imine in accordance with the process of the invention. Suitable catalysts therefore, include such hydrogenation catalysts as finely divided nickel, nickel on kieselguhr, nickel on pumice, colloidal platinum, finely divided palladium, copper chromite and the like. Active nickel catalysts have proved particularly effective. Active nickel in the form commonly referred to as Raney nickel is a preferred catalyst for carrying out the process of the invention. The catalysts may be used in any suitable amounts, the amount used being dependent upon the nature of the catalyst, the character of the reacting substances, the operating conditions of the reaction, etc. In general, however, an amount of catalyst ranging from between about 0.1% and 8.0% by weight, based on the amount of ketone present in the reaction mixture, is a suitable amount. When Raney nickel is used as a catalyst to effect the combination of ketone, ammonia and hydrogen in accordance with the process of the invention, a quantity of from about 4.0% to 6.0%, preferably about 5.0%, has been found to be a desirable amount.

It may in some instances be desirable to carry out the reaction in the presence of an inert solvent in order to better control the reaction and to facilitate the removal of the water formed during the course of the reaction. Suitable substances for this purpose include any inert materials having a suitable boiling point which will act as mutual solvents for the reactants without entering into chemical combination therewith. Certain alcohols, esters, ethers, hydrocarbons, especially the aromatic hydrocarbons such as toluene, the xylenes, and the like exemplify suitable solvents to be used for this purpose.

The process of the invention may be executed in a batch, intermittent or continuous manner. When it is desired to execute the process in a continuous manner, a suitable reaction stage or stages in communication with one or a plurality of separation and purification stages may be provided. The volume of the reaction mixture and the relative concentrations of the reactants in the reaction stage or stages may be kept substantially constant by the intermittent or continuous introduction therein of the reactants at about the same rate at which they are reacted and the products removed from the reaction mixture. The reactants separated from the condensed distillate may be re-utilized by introducing them into a reaction stage as a mixture independently or in conjunction with the main reactant feed or feeds.

The catalytic conversion of ketones to imines by reacting the ketones with ammonia and hydrogen in the presence of a hydrogenation catalyst may be carried out in any plant or laboratory equipment suitable for use with the reagents employed and under the required operating conditions. The reaction may be conveniently carried out, for example, in a steel autoclave of the desired capacity which is fitted with means for stirring or agitating the contents. Means such as a fractionating column for removing the water formed during the course of the reaction may also be provided, if desired.

The process of the invention may be illustrated by the following examples in which the amounts of reactants and products are given in parts by weight.

*Example I*

About 14 parts of isophorone and 1 part of anhydrous ammonia were placed in a hydrogenation autoclave equipped with means for stirring. About 5% of Raney nickel hydrogenation catalyst was added and the mixture hydrogenated for 1 hour at 135° C.–145° C. and a hydrogen pressure of 500 lbs. per sq. in. Distillation of the reaction mixture resulted in the isolation of a good yield of N(dihydroisophoryl)-dihydroisophoronimine.

*Example II*

A charge containing about 5 parts of methylisobutylketone and 1 part of anhydrous ammonia was hydrogenated in the presence of about 5% of Raney nickel catalyst for 1 hour at a temperature of 100° C. and a partial pressure of hydrogen of 500 lbs. per sq. in. Distillation of the reaction mixture resulted in the isolation of a good yield of product which in this case was N(1,3-dimethylbutyl)-methylisobutylketimine.

We claim as our invention:

1. A process for the preparation of N(1,3-dimethylbutyl)-methylisobutylketimine which comprises reacting methylisobutyl ketone, anhydrous ammonia, and hydrogen in the approximate stoichiometric ratio of two mols of methylisobutyl ketone to one mol of ammonia and one mol of hydrogen, at a temperature of between about 100° C. and about 200° C., at a pressure of between about 400 lbs. per sq. in. and about 600 lbs. per sq. in., and in the presence of a hydrogenation catalyst comprising active nickel, and fractionally distilling the reaction mixture under dehydrating conditions to separate the water produced substantially as soon as it is formed and recovering the said N(1,3-dimethylbutyl)-methylisobutylketimine.

2. A process for preparing N(1,3-dimethylbutyl)-methylisobutylketimine which comprises reacting methylisobutyl ketone with ammonia and hydrogen at a temperature of between about 50° C. and about 250° C., at a pressure which is greater than atmospheric pressure, and in the presence of a hydrogenation catalyst while maintaining in the reaction mixture at least two mols of ketone per mol of ammonia present.

3. A process for preparing N(dihydroisophoryl)-dihydroisophoronimine which comprises reacting about two molar equivalents of isophorone with about one molar equivalent of substantially anhydrous ammonia and about three molar equivalents of hydrogen at a temperature of between about 125° C. and about 175° C., at a pressure of between about 400 lbs. per sq. in. and about 600 lbs. per sq. in., and in the presence of an active nickel hydrogenation catalyst, and fractionally distilling the reaction product under dehydrating conditions to separate the water produced substantially as soon as it is formed and recovering the said N(dihydroisophoryl)-dihydroisophoronimine.

4. A process for preparing N(dihydroisophoryl)-dihydroisophoronimine which comprises reacting isophorone with ammonia and hydrogen at a temperature of between about 50° C. and about 250° C., at superatmospheric pressure, and in the presence of a hydrogenation catalyst while maintaining in the reaction mixture at least two mols of ketone per mol of ammonia present.

5. A process for preparing ketimines which comprises reacting an alicyclic ketone with ammonia and hydrogen in the approximate ratio of about one-half molar equivalent of ammonia and one-half molar equivalent of hydrogen for each carbonyl group and about one molar equivalent of hydrogen for each carbon-carbon double bond present in the molecular structure of the said ketone, at a temperature of between about 100° C. and about 200° C., at a pressure of between about 400 lbs. per sq. in. and about 600 lbs. per sq. in., and in the presence of a hydrogenation catalyst comprising active nickel, and fractionally distilling the reaction mixture under dehydrating conditions to separate the water produced substantially as soon as it is formed and recovering the ketimine product.

6. A process for preparing ketimines which comprises reacting a ketone containing not more than one pair of doubly bonded carbon atoms per molecule and having at least one hydrogen atom linked to each of the carbon atoms in alpha position with respect to the carbonyl group with ammonia and hydrogen at a temperature of between about 50° C. and about 250° C., at superatmospheric pressure, and in the presence of a hydrogenation catalyst while maintaining in the reaction mixture at least two mols of ketone per mol of ammonia present, and distilling the reaction mixture to separate the water produced substantially as soon as it is formed and recovering the said ketimine.

7. A process for preparing imines which comprises reacting a ketone having not more than one pair of doubly bonded carbon atoms with ammonia and hydrogen in the approximate ratio of about one-half molar equivalent of ammonia and one-half molar equivalent of hydrogen for each carbonyl group and about one molar equivalent of hydrogen for each carbon-carbon double bond present in the molecular structure of the said ketone, at a temperature of between about 50° C. and about 250° C., at superatmospheric pressure, and in the presence of a hydrogenation catalyst.

8. In a process for preparing N(1,3-dimethylbutyl)-methylisobutylketimine, the step of reacting methylisobutyl ketone with ammonia and hydrogen in the ratio of about 2 mols of said ketone to one mol of ammonia and one mol of hydrogen at a temperature of between about 100° C. and about 200° C., at a pressure of between about 400 lbs. per sq. in. and about 600 lbs. per sq. in., and in the presence of a hydrogenation catalyst comprising active nickel.

9. In a process for preparing N(dihydroisophoryl)-dihydroisophoronimine, the step of reacting isophorone with ammonia and hydrogen in the mol ratio of about 2:1:1 respectively at a temperature of between about 100° C. and about 200° C., at a pressure of between about 400 lbs. per sq. in. and about 600 lbs. per sq. in., and in the presence of an active nickel hydrogenation catalyst.

10. In a process for preparing imines, the step of reacting a ketone with ammonia and hydrogen at a temperature of between about 50° C. and about 250° C., at a pressure of between about 200 lbs. per sq. in. and about 1,000 lbs. per sq. in., and in the presence of a hydrogenation catalyst while maintaining in the reaction mixture at least two mols of ketone per mol of ammonia present.

VERNON E. HAURY.
SEAVER A. BALLARD.

REFERENCES CITED

The following references are of record in the file of this patent:

UNITED STATES PATENTS

| Number | Name | Date |
|---|---|---|
| 558,863 | Valentiner | Apr. 21, 1896 |
| 2,217,630 | Winans | Oct. 8, 1940 |
| 2,319,848 | Clark | May 25, 1943 |
| 2,350,318 | Schonle | May 30, 1944 |